US011836482B2

(12) United States Patent
Ogawa et al.

(10) Patent No.: US 11,836,482 B2
(45) Date of Patent: Dec. 5, 2023

(54) CENTER DEVICE, REPROGRAMMING DATA DISTRIBUTION SYSTEM, AND REPROGRAMMING DATA DISTRIBUTION PLAN CREATION PROGRAM PRODUCT

(71) Applicant: DENSO CORPORATION, Kariya (JP)

(72) Inventors: Tomoya Ogawa, Kariya (JP);
Yoshitaka Ozaki, Kariya (JP);
Yasufumi Iino, Kariya (JP); Haruhiko Kakitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 279 days.

(21) Appl. No.: 17/194,481

(22) Filed: Mar. 8, 2021

(65) Prior Publication Data

US 2021/0191713 A1   Jun. 24, 2021

Related U.S. Application Data

(63) Continuation of application No. PCT/JP2019/035223, filed on Sep. 6, 2019.

(30) Foreign Application Priority Data

Sep. 11, 2018 (JP) .................................. 2018-169771

(51) Int. Cl.
*G06F 9/44* (2018.01)
*G06F 8/656* (2018.01)
*B60R 16/023* (2006.01)
*B60W 10/26* (2006.01)
*H04L 67/00* (2022.01)

(52) U.S. Cl.
CPC .......... *G06F 8/656* (2018.02); *B60R 16/0231* (2013.01); *B60W 10/26* (2013.01); *H04L 67/34* (2013.01); *B60W 2510/244* (2013.01); *B60W 2556/45* (2020.02)

(58) Field of Classification Search
CPC ...................................................... G06F 8/656
USPC ........................................................ 717/172
See application file for complete search history.

(56) References Cited

U.S. PATENT DOCUMENTS

| | | | | |
|---|---|---|---|---|
| 8,190,322 B2* | 5/2012 | Lin | ......... | G07C 5/008 |
| | | | | 701/31.4 |
| 9,606,790 B2* | 3/2017 | Throop | ......... | G06F 16/955 |
| 9,786,170 B2* | 10/2017 | Roy | ......... | G08G 1/096775 |
| 10,623,925 B2* | 4/2020 | Itatsu | ......... | H04W 4/80 |
| 11,061,658 B2* | 7/2021 | Seki | ......... | G06F 13/00 |
| 2009/0094593 A1* | 4/2009 | Jaung | ......... | G06F 8/65 |
| | | | | 717/173 |

(Continued)

FOREIGN PATENT DOCUMENTS

| | | |
|---|---|---|
| JP | 2007279852 A | 10/2007 |
| JP | 2010191786 A | 9/2010 |

(Continued)

*Primary Examiner* — Evral E Bodden
(74) *Attorney, Agent, or Firm* — Harness, Dickey & Pierce, P.L.C.

(57) ABSTRACT

A center device is configured to: acquire behavior data indicating a behavior of a user; store the behavior data; acquire vehicle state data indicating a vehicle state; store the vehicle state data; create a distribution plan of reprogramming data to be distributed to vehicle devices of the vehicle by using the behavior data and the vehicle state data; and distribute the reprogramming data to the vehicle devices according to the created distribution plan.

10 Claims, 5 Drawing Sheets

(56) References Cited

U.S. PATENT DOCUMENTS

2013/0096737 A1    4/2013   Suganuma et al.
2015/0113521 A1    4/2015   Suzuki et al.
2018/0074811 A1    3/2018   Kiyama et al.

FOREIGN PATENT DOCUMENTS

| JP | 2011053954 A | * | 3/2011 |
| JP | 2012014253 A | | 1/2012 |
| JP | 5581272 B2 | | 8/2014 |
| JP | 2015079468 A | | 4/2015 |
| JP | 2016224503 A | | 12/2016 |
| JP | 2018005894 A | | 1/2018 |
| JP | 2018045515 A | | 3/2018 |

\* cited by examiner

| VEHICLE ID | REPROGRAM RESERVATION | REPROGRAMMING DATA IN STANDBY STATE | LPWA COMMUNICATION STATE | LTE COMMUNICATION STATE | LTE COMMUNICATION POSSIBLE TIME | VEHICLE POSITION | BATTERY REMAINING AMOUNT | SCHEDULED DISTRIBUTION TIME | DISTRIBUTION GROUP |
|---|---|---|---|---|---|---|---|---|---|
| 0001 | RESERVED | STANDBY | CONNECTED | DISCONNECTED | 13:00 | PROPER | PROPER | 13:05 | A |
| 0002 | RESERVED | STANDBY | CONNECTED | DISCONNECTED | 14:15 | PROPER | PROPER | 14:20 | B |
| 0003 | NOT RESERVED | STANDBY | CONNECTED | DISCONNECTED | 14:05 | PROPER | PROPER | | |
| 0004 | RESERVED | STANDBY | CONNECTED | DISCONNECTED | 13:01 | PROPER | PROPER | 13:05 | A |
| 0005 | RESERVED | STANDBY | CONNECTED | DISCONNECTED | 14:17 | PROPER | PROPER | 14:20 | B |
| 0006 | RESERVED | NO STANDBY | CONNECTED | DISCONNECTED | 13:01 | PROPER | PROPER | | |
| 0007 | RESERVED | STANDBY | CONNECTED | DISCONNECTED | N/A | PROPER | PROPER | | |
| 0008 | RESERVED | STANDBY | CONNECTED | DISCONNECTED | 13:01 | NOT PROPER | PROPER | | |
| 0009 | RESERVED | STANDBY | CONNECTED | DISCONNECTED | 14:03 | PROPER | NOT PROPER | | |
| ... | ... | ... | ... | ... | ... | ... | ... | | |

FIG. 5

CENTER DEVICE, REPROGRAMMING DATA DISTRIBUTION SYSTEM, AND REPROGRAMMING DATA DISTRIBUTION PLAN CREATION PROGRAM PRODUCT

CROSS REFERENCE TO RELATED APPLICATION

The present application is a continuation application of International Patent Application No. PCT/JP 2019/035223 filed on Sep. 6, 2019, which designated the U.S. and claims the benefit of priority from Japanese Patent Application No. 2018-169771 filed on Sep. 11, 2018. The entire disclosures of all of the above applications are incorporated herein by reference.

TECHNICAL FIELD

The present disclosure relates to a center device, a reprogramming data distribution system, and a reprogramming data distribution plan creation program product.

BACKGROUND

In recent years, with the development of technologies related to connected cars, application programs of an electronic control device mounted on a vehicle can be wirelessly reprogrammed by using the technology of connected cars.

SUMMARY

A center device is configured to: acquire behavior data indicating a behavior of a user; store the behavior data; acquire vehicle state data indicating a vehicle state; store the vehicle state data; create a distribution plan of reprogramming data to be distributed to vehicle devices of the vehicle by using the behavior data and the vehicle state data; and distribute the reprogramming data to the vehicle devices according to the created distribution plan.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In recent years, with the development of communication network technologies, technologies related to connected cars are developing. It is assumed that an application program of an electronic control device (hereinafter referred to as an ECU, which is short for electronic control unit) mounted on a vehicle may be wirelessly reprogrammed by using the technology of connected car. In the configuration in which the application program of the ECU is reprogrammed wirelessly, a vehicle device that manages the reprogramming on the vehicle side downloads the reprogramming data from a center device, distributes the downloaded reprogramming data to the ECU to be reprogrammed, and reprograms the application of the ECU.

In a case where the center device distributes the reprogramming data to the vehicle device, when the number of ECUs which is to be reprogrammed increases, the center device needs to distribute the reprogramming data to a large number of vehicle devices, and the vehicle device may fail to smoothly reprogram all of the vehicle devices. Thus, in the center device, a mechanism for efficiently distributing the reprogramming data is required.

According to an aspect of the present disclosure, a behavior data acquisition unit is configured to acquire behavior data indicating a behavior of a user, a behavior data storage is configured to store the behavior data when the behavior data is acquired by the behavior data acquisition unit, a vehicle state data acquisition unit is configured to acquire vehicle state data indicating a state of a vehicle, a vehicle state data storage is configured to store the vehicle state data when the vehicle state data is acquired by the vehicle state data acquisition unit, a distribution plan creation unit is configured to create a distribution plan of reprogramming data to be distributed to multiple vehicle devices of the vehicle by using the behavior data stored in the behavior data storage and the vehicle state data stored in the vehicle state data storage, and a distribution control unit is configured to distribute the reprogramming data to the vehicle devices according to the distribution plan when the distribution plan is created by the distribution plan creation unit.

In the above configuration, a distribution plan for distributing the reprogramming data to multiple vehicles is created using the behavior data indicating the user behavior and the vehicle state data indicating the vehicle state. The reprogramming data is distributed to the vehicle devices according to the created distribution plan. By distributing the reprogramming data in consideration of the user's behavior and the vehicle state, the reprogramming data can be efficiently distributed even when the reprogramming data needs to be distributed to a large number of vehicle devices.

According to another aspect of the present disclosure, a reprogramming data distribution system includes the center device according to the above-described aspect and a vehicle device configured to download the reprogramming data from the center device and distribute the downloaded reprogramming data to an electronic control unit to be reprogrammed.

According to another aspect of the present disclosure, a reprogramming data distribution plan creation program product is stored in a tangible non-transitory computer-readable storage medium and includes instructions to be executed by a center device. The instructions include: acquiring behavior data indicating a behavior of a user; acquiring vehicle state data indicating a state of a vehicle; and creating a distribution plan of reprogramming data for a plurality of vehicle devices using the acquired behavior data and the acquired vehicle state data.

Figure 1:
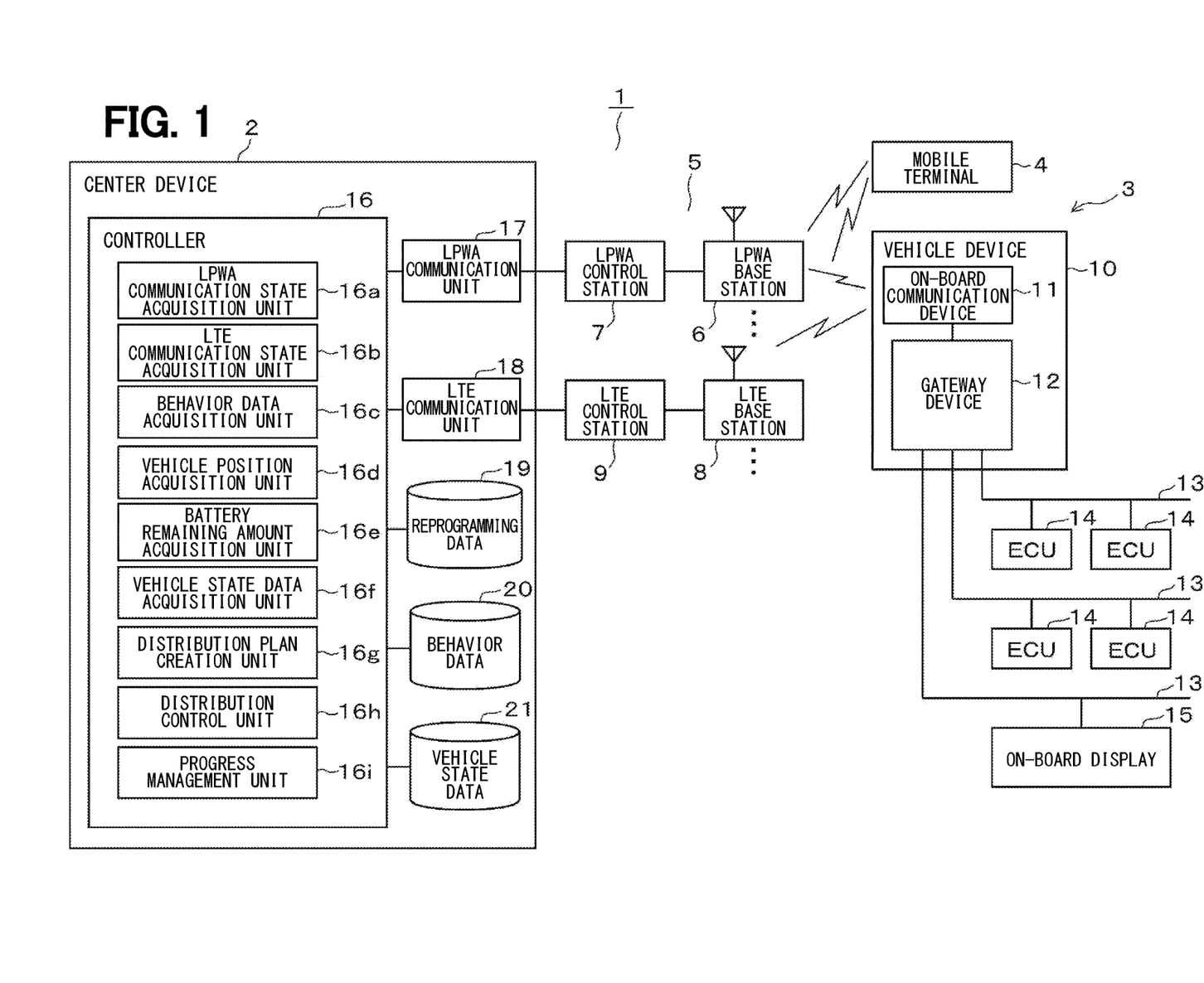
FIG. 1 is a diagram showing an entire configuration according to an embodiment of the present disclosure.

Hereinafter, an embodiment of the present disclosure will be described with reference to the drawings. A reprogramming data distribution system is a system that wirelessly reprograms application programs related to, such as vehicle control and diagnosis of the ECU mounted on the vehicle. As shown in FIG. 1, the reprogramming data distribution system 1 includes a center device 2, a vehicle system 3 mounted on a vehicle and used by a user, and a mobile terminal 4 carried by the user. The mobile terminal 4 may be provided by a smartphone or a tablet having a web browser. The center device 2, the vehicle system 3, and the mobile terminal 4 are configured to be communicable with one another via a communication network 5. Each of the center device 2, the vehicle system 3, and the mobile terminal 4 has a one-to-multiple relationship. For example, the center device 2 can perform data communication with multiple vehicle systems 3 and multiple mobile terminals 4.

The communication network 5 may include a communication network compliant with LPWA (Low Power Wide Area) communication method (corresponding to first communication method) and a communication network compliant with LTE (Long Term Evolution) communication method (corresponding to second communication method). The communication network 5 includes multiple LPWA base stations 6 and a LPWA control station 7 that controls the multiple LPWA base stations 6. The communication network 5 includes multiple LTE base stations 8 and a LTE control station 9 that controls the multiple LTE base stations 8. The LPWA control station 7 monitors communication status between the LPWA base stations 6 and the vehicle, and manages whether the vehicle is positioned within a communication range of the LPWA communication or out of the communication range for each vehicle ID. The LTE control station 9 monitors communication status between the LTE base stations 8 and the vehicle, and manages whether the vehicle is positioned within a communication range of the LTE communication or out of the communication range for each vehicle ID.

A communication network compliant with the LPWA communication method has characteristics that the communication range is wider and the power consumption is lower compared with the communication range and the power consumption of a communication network compliant with the LTE communication method. The communication network compliant with the LTE communication method is more suitable for large-capacity data communication compared with the communication network compliant with the LPWA communication method. In the reprogramming data distribution system 1, the reprogramming data may be distributed from the center device 2 to the vehicle system 3 by the LTE communication method.

The vehicle system 3 includes a vehicle device 10. The vehicle device 10, which is mounted on the vehicle, includes an on-board communication device 11 and a gateway device 12, and the on-board communication device 11 and the gateway device 12 are connected so as to be capable of performing data communication. The on-board communication device 11 performs data communication with the center device 2 via the communication network 5. When the on-board communication device 11 downloads the reprogramming data from the center device 2, the on-board communication device 11 transfers the downloaded reprogramming data to the gateway device 12.

The gateway device 12 has a data relay function, and when the reprogramming data is transferred from the on-board communication device 11, the transferred reprogramming data is distributed to the reprogram target ECU which has the target application program to be reprogrammed by the reprogramming data. When the reprogram target ECU receives the reprogramming data from the gateway device 12, the received reprogramming data is written into the flash memory to rewrite the application program.

Various ECUs 14 and an on-board display 15 are connected to the gateway device 12 via a bus 13. The bus 13 is, for example, a body network bus, a traveling network bus, a multimedia network bus, or the like. The ECUs 14 connected to the body network bus include, for example, a door ECU for controlling locking/unlocking of doors, a meter ECU for controlling a meter display, an air conditioning ECU for controlling an air conditioner, a window ECU for controlling opening/closing of windows. The ECUs 14 connected to the traveling network bus include, for example, an engine ECU for controlling an engine, a brake ECU for controlling braking operation, an ECT ECU for controlling automatic transmission operation, a power steering ECU for controlling power steering operation. The ECUs 14 connected to the multimedia network bus include, for example, a navigation ECU for controlling a navigation system, an ETC ECU for controlling an electronic toll collection system (ETC: electronic toll collection system, ETC is a registered trademark). The bus 13 may be another type of system bus other than the body network bus, the traveling network bus, and the multimedia network bus. The detailed number of the bus 13 and the detailed number of ECUs 14 are not limited to the illustrated configuration.

The on-board display 15 may be configured to have a navigation function, and displays various contents on display screens. In a case where the user reprograms the application program of the ECU 14 in the vehicle, the user can input operation while checking various display screens related to the reprogram on the on-board display 15, and perform the procedure related to the reprogram of the application program. In a case where the user reprograms the application program of the ECU 14 from outside of the vehicle, the user can input operation while checking various screens related to the reprogram on the mobile terminal 4, and perform the procedure related to the reprogram of the application program. That is, the user can properly use the on-board display 15 inside the vehicle and use the mobile terminal 4 from outside of the vehicle, and can perform procedure related to the reprogram of the application program.

The gateway device 12 is connected, via the bus 13, to a remaining amount detection circuit that detects a remaining battery amount of a GPS (Global Positioning System) receiver and a vehicle-mounted battery. The on-board communication device 11 transmits a vehicle position notification signal to the center device 2 via the communication network 5. The vehicle position notification signal that indicates a vehicle position transmitted from the GPS receiver to the gateway device 12, and the on-board communication device 11 acquires the vehicle position notification signal from the gateway device 12. The on-board communication device 11 acquires, from the gateway device, a remaining battery amount notification signal, which indicates the remaining battery amount of the vehicle-mounted battery and is input to the gateway device 12 from the remaining amount detection circuit. The on-board communication device 11 transmits the remaining battery amount notification signal, via the communication network 5, to the center device 2.

The center device 2 includes a controller 16, an LPWA communication unit 17 (corresponding to first wireless communication unit), an LTE communication unit 18 (corresponding to second wireless communication unit), a reprogramming data storage 19, a behavior data storage 20, and a vehicle state data storage 21. In the present embodiment, a configuration that distributes the reprogramming data and creates the distribution plan of the reprogramming data are included in the same center device 2 as illustrated. Alternatively, distribution of the reprogramming data and the creation of reprogramming data distribution plan may be executed by separate center devices which are linked to one another. The LPWA communication unit 17 and the LTE communication unit each may be provided by a communication circuit, such as a transceiver.

The controller 16 includes a microcomputer having a CPU (central processing unit), a ROM (read only memory), a RAM (random access memory), and the like. The controller executes a control program stored in a non-transitory tangible storage medium to perform various processes and controls the operation of the center device 2. The control program executed by the controller 16 includes a distribution plan creation program and a reprogramming data distribution program.

The controller 16 includes an LPWA communication state acquisition unit 16a (corresponding to first communication state acquisition unit), an LTE communication state acquisition unit 16b (corresponding to second communication state acquisition unit), a behavior data acquisition unit 16c, a vehicle position acquisition unit 16d, a battery remaining amount acquisition unit 16e, a vehicle state data acquisition unit 16f, a distribution plan creation unit 16g, a distribution control unit 16h, and a progress management unit 16i.

The LPWA communication state acquisition unit 16a acquires information managed by the LPWA control station 7, and determines, for each vehicle ID, whether the vehicle position is within the LPWA communication range or outside of the LPWA communication range. The LPWA communication state acquisition unit 16a acquires, for each vehicle ID, an LPWA communication state indicating whether the on-board communication device 11 is in connected state or disconnected state with the LPWA communication network.

The LTE communication state acquisition unit 16b acquires information managed by the LTE control station 9, and determines, for each vehicle ID, whether the vehicle position is within the LTE communication range or outside of the LTE communication range. The LTE communication state acquisition unit 16b acquires, for each vehicle ID, an LTE communication state indicating whether the on-board communication device 11 is in connected state or disconnected state with the LTE communication network.

The behavior data acquisition unit 16c acquires, as behavior data that indicates behavior of the user, the LPWA communication state acquired by the LPWA communication state acquisition unit 16a and the LTE communication state acquired by the LTE communication state acquisition unit 16b. Then, the behavior data acquisition unit 16c stores the acquired behavior data in the behavior data storage 20. The behavior data acquisition unit 16c specifies that the vehicle is in a travelling state by, for example, determining that the vehicle position is changed. The behavior data acquisition unit 16c specifies that the vehicle is in a stopped state by, for example, determining that the vehicle position is not changed. In a case where the behavior data acquisition unit 16c identifies that the vehicle is in the travelling state or in the stopped state, the behavior data acquisition unit 16c further determines whether an area where the vehicle is travelling or stopped is (i) within the LPWA communication range or out of the LPWA communication range, (ii) or within the LTE communication range or out of the LTE communication range. The LPWA communication unit 17 and the LTE communication unit 18 receives various notification signals from the vehicle system 3 via the communication network 5. For example, when the vehicle is in stopped state, the behavior data acquisition unit 16c may specify, based on the received notification signals, whether the vehicle is a maintenance shop and a diagnosis work of the vehicle is in progress.

The vehicle position acquisition unit 16d acquires the vehicle position based on the vehicle position notification signal, which is transmitted from the vehicle system 3 to the LPWA communication unit 17 and the LTE communication unit 18 via the communication network 5. The battery remaining amount acquisition unit 16e acquires the battery remaining amount based on the battery remaining amount notification signal, which is transmitted from the vehicle system 3 to the LPWA communication unit 17 and the LTE communication unit 18 via the communication network 5.

The vehicle state data acquisition unit 16f acquires, as vehicle state data that indicates a state of the vehicle, the vehicle position, which is acquired by the vehicle position acquisition unit 16d, and the battery remaining amount, which is acquired by the battery remaining amount acquisition unit 16e. The vehicle state data acquisition unit 16f stores the acquired vehicle state data in the vehicle state data storage 21.

The distribution plan creation unit 16g creates the distribution plan of the reprogramming data to be distributed to multiple vehicle devices 10 by using the behavior data stored in the behavior data storage 20 and the vehicle state data stored in the vehicle state data storage 21. The distribution plan creation unit 16g sets the vehicle which is positioned within a predetermined area as the target of the distribution plan, and excludes the vehicle which is positioned out of the predetermined area from the target of distribution plan. For example, the predetermined area may be an area where the radio wave environment is in good condition and unauthorized data communication does not occur. The distribution plan creation unit 16g can exclude the vehicle, which is positioned in the area where the radio wave environment is not in good condition and unauthorized data communication of vehicle frequently occurs, from the target of distribution plan by determining whether the vehicle is positioned within the predetermined area. Herein, unauthorized data communication of vehicle may refer to communication which cannot provide communication guarantee, such as alteration of data.

The distribution plan creation unit 16g sets the vehicle which has the remaining battery amount equal to or greater than a threshold value as the target of distribution plan. The distribution plan creation unit 16g excludes the vehicle which has the remaining battery amount less than the threshold value from the target of distribution plan. For example, the threshold value may be set to a value sufficiently greater than an estimated consumption power that is expected to be consumed for normally completing the reprogram from the start of the reprogram. The distribution plan creation unit 16g determines whether the remaining battery amount is equal to or greater than the threshold value. By this determination, a vehicle that may run out of battery when starting the reprogram or a vehicle that may fail to normally complete the reprogram after starting the reprogram caused by run out of the battery can be excluded from the distribution plan. The distribution plan creation unit 16g may set the threshold value according to the data amount of the reprogramming data. When the data amount of the reprogramming data is relatively large, the threshold value may be set relatively high. When the data amount of the reprogramming data is relatively small, the threshold value may be set relatively low.

When the distribution plan of the reprogramming data is created by the distribution plan creation unit 16g, the distribution control unit 16h distributes the reprogramming data to the vehicle device 10 according to the created distribution plan. The progress management unit 16i manages the distribution progress of the reprogramming data which is executed by the distribution control unit 16h.

The following will describe an operation of the above configuration with reference to FIG. 2 to FIG. 5. The following will describe, as the process executed by the center device 2, a distribution plan creation process that creates the distribution plan of reprogramming data and a reprogramming data distribution process that distributes reprogramming data according to the reprogramming data distribution plan.

(1) Distribution Plan Creation Process

Figure 2:
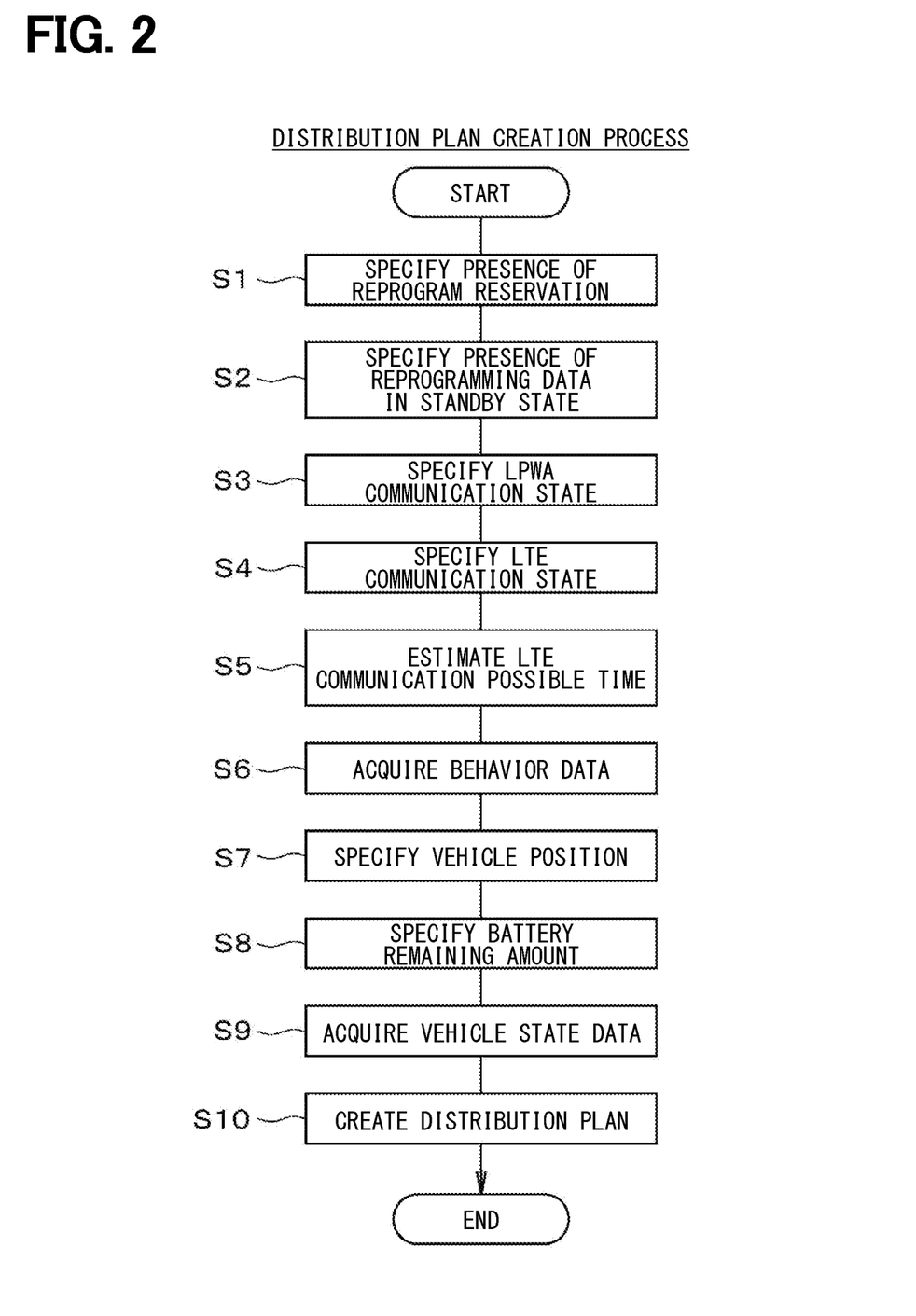
FIG. 2 is a flowchart showing a distribution plan creation process.

In the center device 2, the controller 16 periodically executes the distribution plan creation process at a predetermined cycle. When the controller 16 starts the distribution plan creation process, the controller 16 specifies, for each vehicle ID, presence of a reprogram reservation (S1). For example, when the user sets the reprogram reservation by operating the mobile terminal 4 or the on-board display 15, the controller 16 identifies presence of the reprogram reservation. When the user did not set the reprogram reservation, the controller 16 identifies absence of the reprogram reservation. In a case of confirming presence of reprogram reservation and reprogramming data to be reprogrammed is in a standby state, the controller 16 distributes the reprogramming data in response to a distribution condition of the reprogramming data is satisfied. In a case of confirming absence of reprogram reservation, however reprogramming data to be reprogrammed is in the standby state and the distribution condition of the reprogramming data is satisfied, the controller 16 does not distribute the reprogramming data.

The controller 16 specifies, for each vehicle ID, a presence or absence of reprogramming data in reprogram standby state (S2). The controller 16 specifies the LPWA communication state for each vehicle ID (S3). The controller 16 specifies that the vehicle existing within the communication range of LPWA is in connected state, and the vehicle existing outside of the communication range of LPWA is in disconnected state.

The controller 16 specifies the LTE communication state for each vehicle ID (S4). The controller 16 specifies that the vehicle existing within the communication range of LTE is in connected state, and the vehicle existing outside of the communication range of LTE is in disconnected state.

The controller 16 predicts estimated LTE communication possible time for the vehicle specified to be in disconnected state of the LTE communication (S5). Specifically, the controller 16 compares the vehicle position, a traveling locus, a destination, and the like with the LTE communication range, and predicts, as the estimated LTE communication possible time, the time when the vehicle enters the LTE communication range from a position outside of the LTE communication range. The controller 16 acquires the specified LPWA communication state and the specified LTE communication state, and the estimated LTE communication possible time as the behavior data (S6: behavior data acquisition procedure). The controller 16 estimates the time when the vehicle enters the area suitable for downloading the reprogramming data from the center device 2 to the on-board communication device 11 by predicting the estimated LTE communication possible time.

The controller 16 specifies the vehicle position based on the vehicle position notification signal, which is transmitted from the vehicle system 3 to the LPWA communication unit 17 and the LTE communication unit 18 via the communication network 5 (S7). The controller 16 specifies the battery remaining amount of the vehicle-mounted battery based on the battery remaining amount notification signal, which is transmitted from the vehicle system 3 to the LPWA communication unit 17 and the LTE communication unit 18 via the communication network 5 (S8). The controller 16 acquires the vehicle position and the remaining battery amount specified in this way as vehicle state data (S9: vehicle state data acquisition procedure).

The controller 16 acquires threat information from a management device (not shown) that manages an area where the radio wave environment is in poor condition or manages an area where unauthorized data communication occurs frequently. The controller 16 determines whether the vehicle position is within a proper area based on the acquired threat information. The controller 16 determines that the vehicle is in "proper state" in response to the vehicle being positioned within the proper area, and sets the corresponding vehicle as the target of the distribution plan. The controller 16 determines that the vehicle is in "improper state" in response to the vehicle being positioned outside of the proper area, and excludes the corresponding vehicle from the target of the distribution plan.

The controller 16 calculates the power expected to be consumed from the start of the reprogram to the normal completion of the reprogram as the estimated consumption power. The controller 16 sets the threshold value to be sufficiently larger than the estimated consumption power, and determines whether the remaining battery amount equal to or greater than the threshold value. The controller 16 determines that the vehicle is in "proper state" in response to the remaining battery amount being equal to or greater than the threshold value, and sets the corresponding vehicle as the target of the distribution plan. The controller 16 determines that the vehicle is in "improper state" in response to the remaining battery amount being lower than the threshold value, and excludes the corresponding vehicle from the target of the distribution plan.

Figure 4:
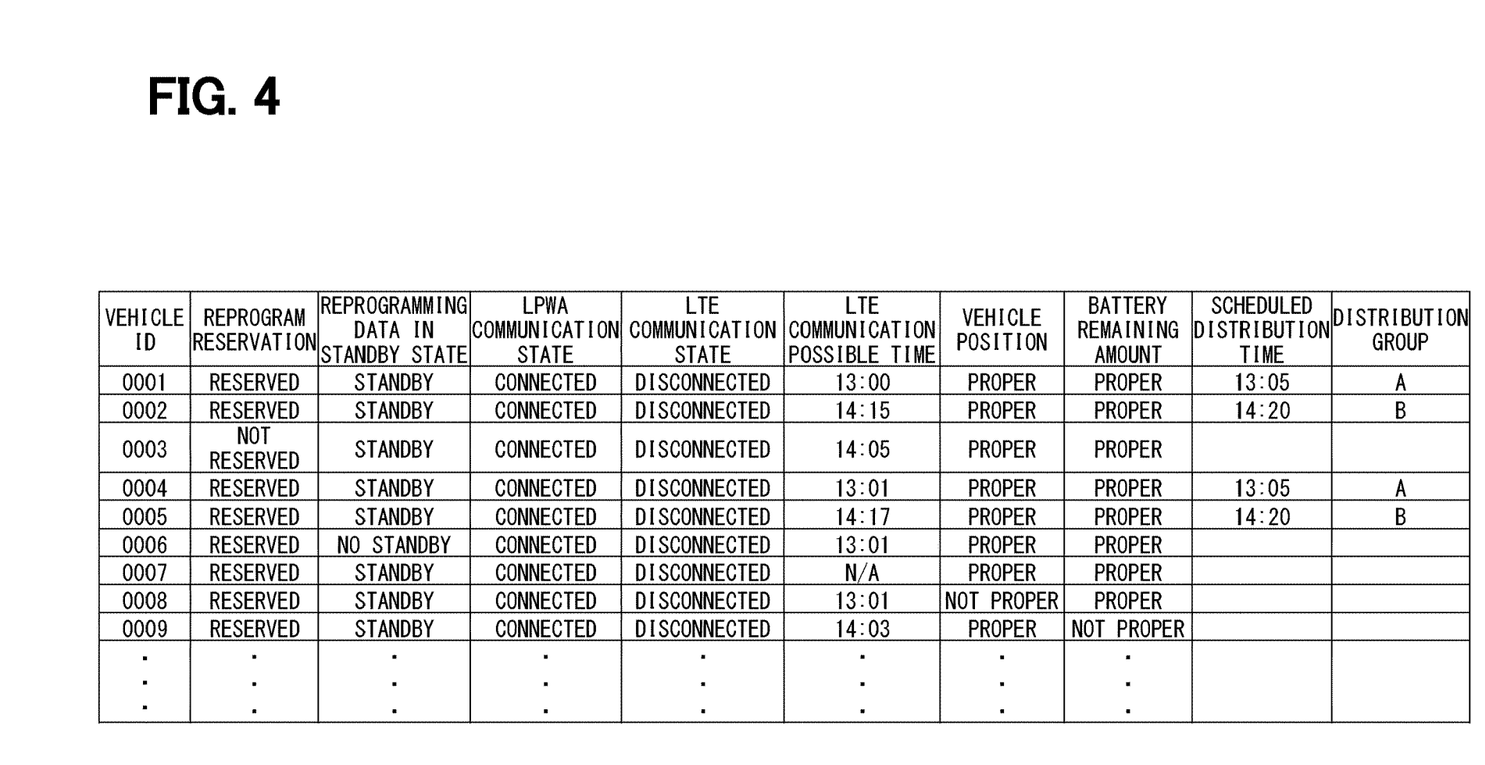
FIG. 4 is a diagram showing a user behavior and a vehicle state for each vehicle ID.

The controller 16 creates the distribution plan using the behavior data and the vehicle state data acquired as described above (S10, distribution plan creation procedure). Specifically, as shown in FIG. 4, the controller 16 determines the vehicle IDs "0001" and "0004" each of which has the estimated LTE communication possible time close to one other as the same distribution group, and sets a time close to the estimated LTE communication possible times of the respective vehicles in the same distribution group as a scheduled distribution time. The controller 16 determines the group "A" as a distribution group including the vehicle IDs "0001" and "0004", and determines "13:05" as the scheduled distribution time. The controller 16 determines the vehicle IDs "0002" and "0005" each of which has the estimated LTE communication possible time close to one other as the same distribution group, and sets a time close to the estimated LTE communication possible times of the respective vehicles in the same distribution group as the scheduled distribution time. For example, the controller 16 determines the group "B" as a distribution group including the vehicle IDs "0002" and "0005", and determines a time point "14:20" as the scheduled distribution time.

The controller 16 excludes the vehicle IDs "0003", "0006", "0007", "0008", and "0009" from the target of distribution plan. Herein, the vehicle ID "0003" is specified as a vehicle which has no reprogram reservation. The vehicle ID "0006" is specified as the vehicle which has no reprogramming data in reprogram standby state. The vehicle ID "0007" is specified as a vehicle which has not predicted the estimated LTE communication possible time. The vehicle ID "0008" is specified as a vehicle which is positioned in the improper area. The vehicle ID "0009" is specified as a vehicle which has insufficient remaining battery amount. After the controller 16 creates the distribution plan in the above-described manner, the controller 16 ends the distribution plan creation process. In a case where the vehicle is in the travelling state, the LPWA communication state, the LTE communication state, the vehicle position, the remaining battery amount, etc. change every moment according to the travelling position and travelling state of the vehicle. Thus, the controller 16 creates (updates) the distribution plan using the latest behavior data and the latest vehicle state data.

(2) Reprogramming Data Distribution Process

Figure 3:
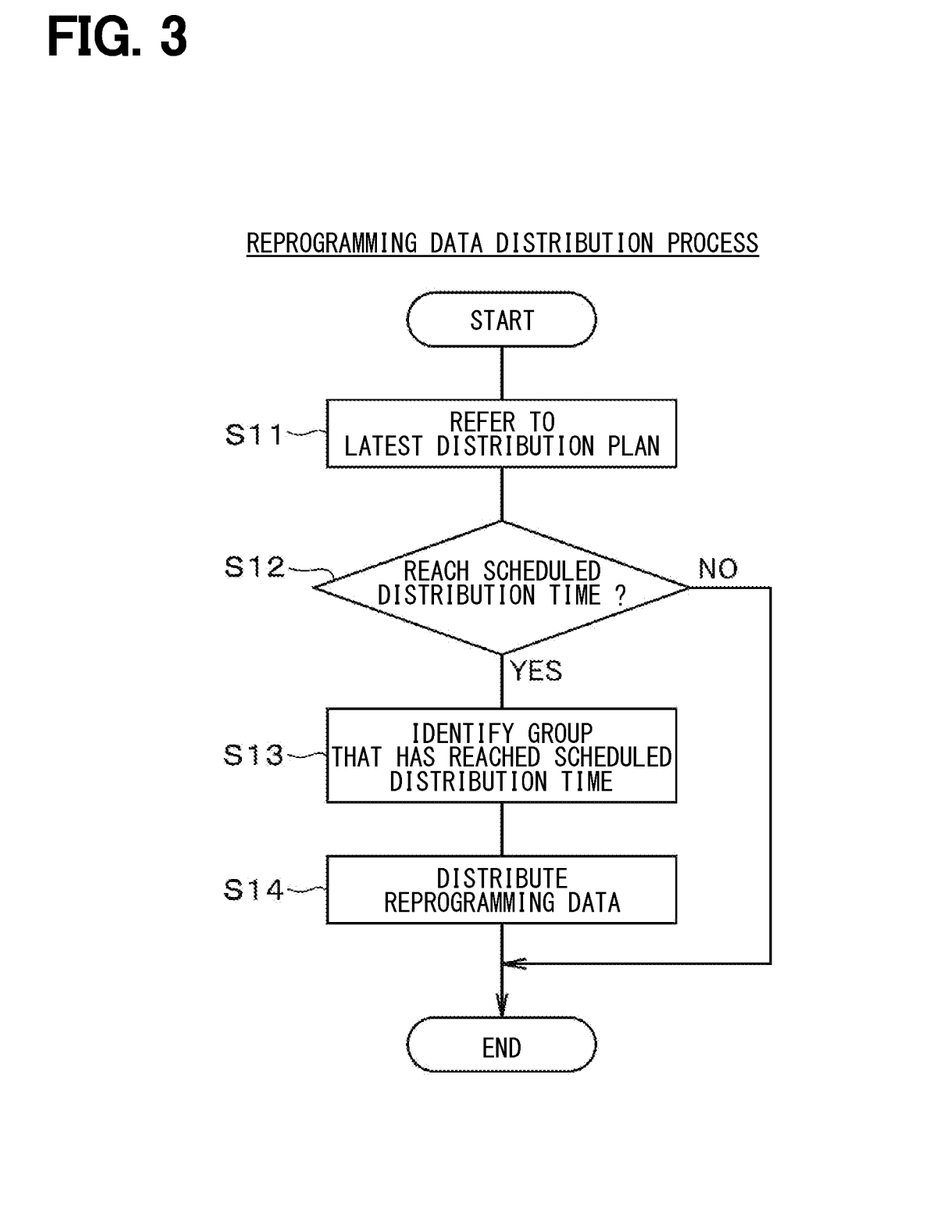
FIG. 3 is a flowchart showing a distribution process of reprogramming data.

In the center device 2, the controller 16 periodically executes the reprogramming data distribution process at a predetermined cycle. When the controller 16 starts the reprogramming data distribution process, the controller 16 refers to the latest distribution plan created by the distribution plan creation process (S11), and determines whether the scheduled distribution time has been reached (S12). In response to the controller 16 determining that the scheduled distribution time has been reached (S12: YES), the controller 16 identifies the distribution group that has reached the scheduled distribution time (S13), and transmits the reprogramming data from the LTE communication unit 18 to the vehicle device 10 of the vehicle ID included in the identified distribution group (S14). Then, the reprogramming data distribution process is ended.

Figure 5:
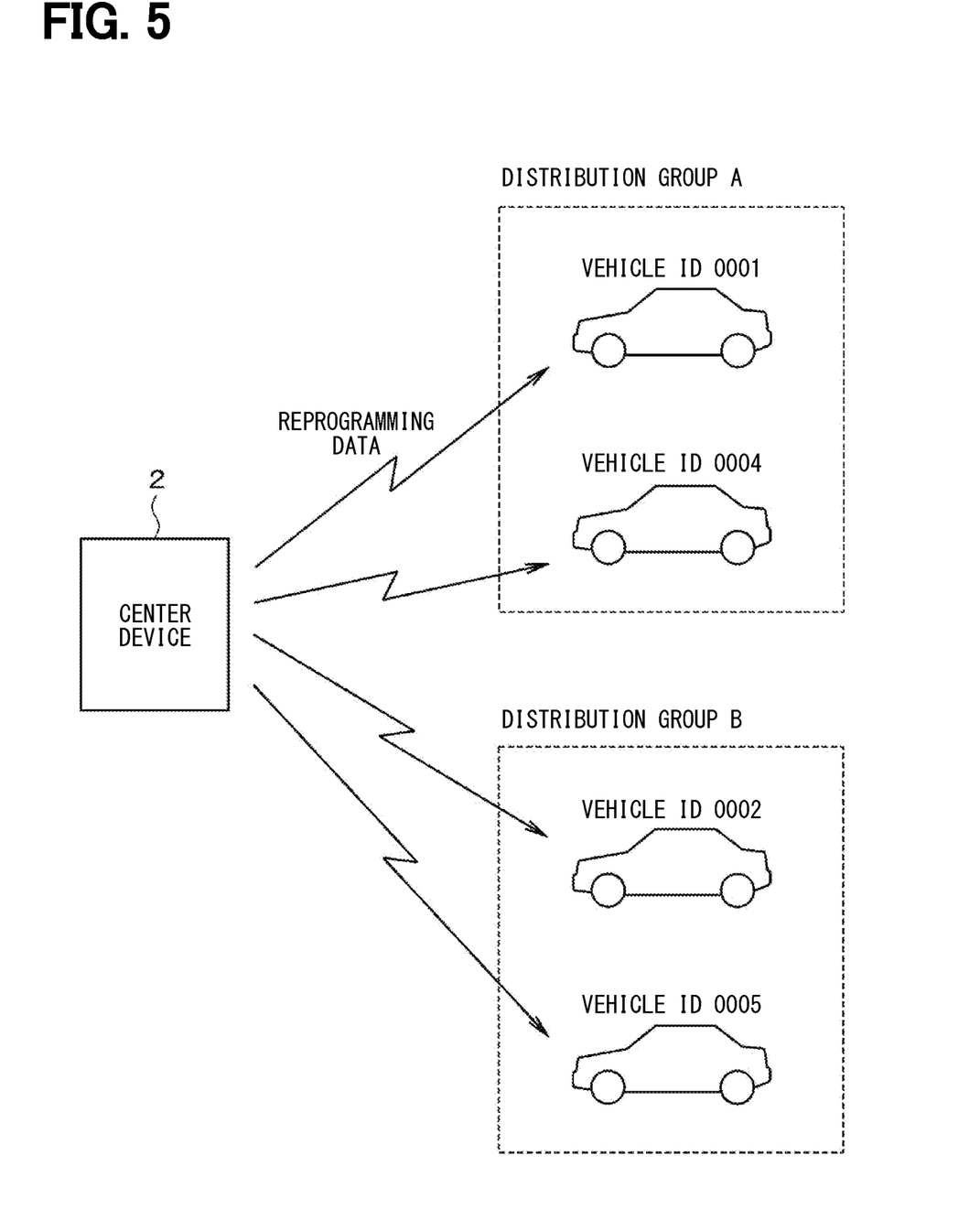
FIG. 5 is a diagram showing distribution of reprogramming data.

As shown in FIG. 5, when the current time reaches "13:05", the controller 16 identifies the group "A" that has the scheduled distribution time of "13:05" as the distribution target, and outputs the reprogramming data to the vehicle devices 10 of the vehicles having the vehicle IDs of "0001" and "0004". When the current time reaches "14:20", the controller 16 identifies the group "B" that has the scheduled distribution time of "14:20" as the distribution target, and outputs the reprogramming data to the vehicle devices 10 of the vehicles having the vehicle IDs of "0002" and "0005".

The present embodiment as described above provides the following technical effects.

In the center device 2, the distribution plan for distributing the reprogramming data to multiple vehicles is created using the behavior data indicating the user behavior and the vehicle state data indicating the vehicle state. The reprogramming data is distributed to the vehicle devices 10 according to the created distribution plan. By distributing the reprogramming data in consideration of the user's behavior and the vehicle state, the reprogramming data can be efficiently distributed even when the reprogramming data needs to be distributed to a large number of vehicle devices 10.

In the center device 2, the behavior data is acquired according to the LPWA communication state and the LTE communication state. The time when the vehicle enters the LTE communication range from outside of the LTE communication range is predicted as the estimated LTE communication possible time. Thus, the time when the vehicle enters an area proper for downloading the reprogramming data from the center device 2 to the on-board communication device 11 can be estimated, and the reprogramming data can be distributed according to the estimated time.

The center device 2 acquires the vehicle position as the vehicle state data, and sets the vehicle which is positioned within the predetermined area as the target of the distribution plan, and excludes the vehicle which is positioned out of the predetermined area from the target of distribution plan. For example, a vehicle positioned in an area which has poor radio wave environment condition or an area where unauthorized data communication occurs frequently can be excluded from the target of distribution plan. Thus, it is possible to avoid the problem, such as occurrence of data alteration in advance.

The center device 2 acquires the remaining battery amount of the vehicle-mounted battery as the vehicle state data, and sets the vehicle which has the remaining battery amount equal to or greater than the threshold value as the target of the distribution plan, and excludes the vehicle which has the remaining battery amount less than the threshold value from the target of distribution plan. With this configuration, when a vehicle has a battery remaining amount which cannot secure sufficient power consumption from the start of reprogram to the normal completion of reprogram, the vehicle can be excluded from the target of distribution plan. Thus, after the start of the reprogram, a case where the reprogram fails to normally complete due to the insufficient battery remaining amount can be avoided in advance.

The center device 2 manages the progress of reprogramming data distribution. Thus, it is possible to manage the history indicating whether the reprogram is completed normally.

While the present disclosure has been described based on the embodiment, the present disclosure is not limited to the embodiment or structure described herein. The present disclosure encompasses various modifications and variations within the scope of equivalents. Additionally, various combinations and configurations, as well as other combinations and configurations including more, less, or only a single element, are within the scope and spirit of the present disclosure.

In the foregoing embodiment, the center device 2 and the vehicle device 10 perform data communication using the LPWA communication method and the LTE communication method. Alternatively, the center device 2 and the vehicle device 10 may perform data communication using another communication method. For example, the center device 2 and the vehicle device 10 may be configured to perform data communication via a communication network including WiFi (Wireless Fidelity) (registered trademark).

When determining the distribution group, the maximum number of vehicles included in the distribution group may be set in advance. For example, the maximum number may be set according to the data amount of the reprogramming data. When the data amount of the reprogramming data is relatively large, the maximum number may be set relatively small. When the data amount of the reprogramming data is relatively small, the maximum number may be set relatively large.

The controller and method described in the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. Further, the computer program may be stored in a computer-readable non-transitory tangible storage medium as instructions to be executed by a computer. The technique for realizing the functions of each unit included in the controller does not necessarily need to include software, and all the functions may be realized using one or a plurality of hardware circuits.

What is claimed is:

1. A center device comprising:
a behavior data acquisition unit configured to acquire behavior data indicating a behavior of a user;
a behavior data storage configured to store the behavior data acquired by the behavior data acquisition unit;
a vehicle state data acquisition unit configured to acquire vehicle state data indicating a state of a vehicle;
a vehicle state data storage configured to store the vehicle state data acquired by the vehicle state data acquisition unit;
a distribution plan creation unit configured to create a distribution plan of reprogramming data to be distributed to a plurality of vehicle devices of the vehicle by using the behavior data stored in the behavior data storage and the vehicle state data stored in the vehicle state data storage;
a distribution control unit configured to distribute the reprogramming data to the plurality of vehicle devices according to the distribution plan created by the distribution plan creation unit; and
a first wireless communication unit configured to wirelessly communicate with the vehicle using a first communication method within a first communication range;
a first communication state acquisition unit configured to acquire a first communication state between the vehicle and the first wireless communication unit;
a second wireless communication unit configured to wirelessly communicate with the vehicle using a second communication method within a second communication range which is smaller than the first communication range; and
a second communication state acquisition unit configured to acquire a second communication state between the vehicle and the second wireless communication unit;
wherein:
the behavior data acquisition unit acquires, as the behavior data, the first communication state acquired by the first communication state acquisition unit and the second communication state acquired by the second communication state acquisition unit; and
the behavior data acquisition unit acquires the behavior data indicating the behavior of the user based on the (i) the first communication state acquired by the first communication state acquisition unit, (ii) the second communication state acquired by the second communication state acquisition unit, and (iii) a second communication possible time at which the vehicle is estimated to enter the second communication range from a position outside of the second communication range by comparing a position of the vehicle, a traveling locus of the vehicle, or a destination of the vehicle with the second communication range specified based on the second communication state.

2. The center device according to claim 1, further comprising
a vehicle position acquisition unit configured to acquire a position of the vehicle,
wherein the vehicle state data acquisition unit acquires, as the vehicle state data, the position of the vehicle acquired by the vehicle position acquisition unit.

3. The center device according to claim 2, wherein
the distribution plan creation unit sets the vehicle which is positioned within a predetermined area as a target of the distribution plan, and
the distribution plan creation unit excludes the vehicle which is positioned out of the predetermined area from the target of the distribution plan.

4. The center device according to claim 1, further comprising
a battery remaining amount acquisition unit configured to acquire a remaining amount of a vehicle-mounted battery,
wherein the vehicle state data acquisition unit acquires, as the vehicle state data, the remaining amount of the vehicle-mounted battery which is acquired by the battery remaining amount acquisition unit.

5. The center device according to claim 4, wherein
the distribution plan creation unit sets the vehicle which has the remaining amount of the vehicle-mounted battery equal to or greater than a threshold value as a target of the distribution plan, and
the distribution plan creation unit excludes the vehicle which has the remaining amount of the vehicle-mounted battery less than the threshold value from the target of distribution plan.

6. The center device according to claim 1, further comprising
a progress management unit configured to manage a progress of reprogramming data distribution executed by the distribution control unit.

7. A reprogramming data distribution system comprising:
the center device according to claim 1; and
a vehicle device configured to download the reprogramming data from the center device and distribute the downloaded reprogramming data to an electronic control unit to be reprogrammed.

8. A reprogramming data distribution plan creation program product, which is stored in a tangible non-transitory computer-readable storage medium and comprising instructions to be executed by a center device, the instructions comprising:
acquiring, using a behavior data acquisition unit, behavior data indicating a behavior of a user;
acquiring vehicle state data indicating a state of a vehicle;
creating a distribution plan of reprogramming data for a plurality of vehicle devices using the acquired behavior data and the acquired vehicle state data;
wirelessly communicating, using a first wireless communication unit, with the vehicle using a first communication method within a first communication range;
acquiring, using a first communication state acquisition unit, a first communication state between the vehicle and the first wireless communication unit;
wirelessly communicate, using a second wireless communication unit, with the vehicle using a second communication method within a second communication range which is smaller than the first communication range;
acquiring, using a second communication state acquisition unit, a second communication state between the vehicle and the second wireless communication unit;
wherein:
the behavior data acquisition unit acquires, as the behavior data, the first communication state acquired by the first communication state acquisition unit and the second communication state acquired by the second communication state acquisition unit; and the behavior data acquisition unit acquires the behavior data indicating the behavior of the user based on the (i) the first communication state acquired by the first communication state acquisition unit, (ii) the second communication state acquired by the second communication state acquisition unit, and (iii) a second communication possible time at which the vehicle is estimated to enter the second communication range from a position outside of the second communication range by comparing a position of the vehicle, a traveling locus of the vehicle, or a destination of the vehicle with the second communication range specified based on the second communication state.

9. A center device comprising:

a processor configured to acquire behavior data indicating a behavior of a user from a vehicle system and acquire vehicle state data indicating a state of a vehicle from the vehicle system;

a memory configured to store the behavior data and the vehicle state data acquired by the processor;

a first wireless communication circuit configured to wirelessly communicate with the vehicle using a first communication method within a first communication range; and a second wireless communication circuit configured to wirelessly communicate with the vehicle using a second communication method within a second communication range which is smaller than the first communication range;

wherein the processor creates a distribution plan of reprogramming data to be distributed to a plurality of vehicle devices of the vehicle by using the behavior data and the vehicle state data stored in the memory;

the processor distributes the reprogramming data to the plurality of vehicle devices according to the created distribution plan of the reprogramming data;

the processor is further configured to acquire, as the behavior data, a first communication state between the vehicle and the first wireless communication device and a second communication state between the vehicle and the second wireless communication device; and the processor acquires the behavior data indicating the behavior of the user based on the (i) the first communication state, (ii) the second communication state, and (iii) a second communication possible time at which the vehicle is estimated to enter the second communication range from a position outside of the second communication range by comparing a position of the vehicle, a traveling locus of the vehicle, or a destination of the vehicle with the second communication range specified based on the second communication state.

10. A reprogramming data distribution system comprising:

the center device according to claim 9; and a vehicle device configured to download the reprogramming data from the center device and distribute the downloaded reprogramming data to an electronic control unit to be reprogrammed.

* * * * *